United States Patent [19]
Aoki et al.

[11] Patent Number: 5,118,763
[45] Date of Patent: Jun. 2, 1992

[54] THERMOSETTING POLYMER OF ULTRAHIGH RESISTANCE TO HEAT

[75] Inventors: Nobuo Aoki, Asahi; Toshiyuki Enomoto; Shinchiro Suzuki, both of Yokohama, all of Japan

[73] Assignee: Nippon Oil Co., Ltd., Japan

[21] Appl. No.: 495,681

[22] Filed: Mar. 19, 1990

[30] Foreign Application Priority Data

Mar. 20, 1989 [JP] Japan ................... 1-68247

[51] Int. Cl.$^5$ .............................................. C08F 8/30
[52] U.S. Cl. ............................. 525/332.8; 525/332.9; 525/333.2; 525/359.1; 525/359.6; 525/377
[58] Field of Search ............. 525/332.8, 332.9, 333.2

[56] References Cited
U.S. PATENT DOCUMENTS
3,794,638  2/1974  Westermann ..................... 525/387

FOREIGN PATENT DOCUMENTS
1913278  10/1969  Fed. Rep. of Germany .
2103316   4/1972  France .
1238966   7/1971  United Kingdom .

*Primary Examiner*—Bernard Lipman
*Attorney, Agent, or Firm*—Bruce L. Adams; Van C. Wilks

[57] ABSTRACT

Thermosetting polymers predominantly of a polybutadiene as a base polymer is disclosed, which polybutadiene is so configured as to have a vinyl content of not less than 40% by mol of the total monomer mol and a crosslink reactivity of at least 70% of the vinyl content. The cured polymer is ultrahighly resistant to heat and particularly applicable as an engineering plastics. Also disclosed is a process for producing the thermosetting polymer with the use of a specific initiator.

5 Claims, 5 Drawing Sheets

THERMOSETTING POLYMER OF ULTRAHIGH RESISTANCE TO HEAT

BACKGROUND OF THE INVENTION

1. Technical Field

This invention is directed to thermosetting polymers and particularly to a polybutadiene capable of exhibiting heat resistance at a ultrahigh level. The invention relates further to a process for the production of such polymers.

2. Prior Art

A variety of synthetic polymers have recently found usage as engineering plastic materials which enjoy credit in certain sectors of industry as good substitutes for structural materials such as metals and metal oxides. Weight saving, corrosion resistance and electrical insulation are the primary characteristics peculiar to the synthetic polymers. Engineering plastic materials, in addition to those qualities, are required to be thermally resistant and mechanically strong. Heat resistance in particular can be regarded as determinant of and critical to the nature of such engineering plastics.

Prior polymers of an engineering plastic grade include a thermosetting class of epoxy resin, unsaturated polyester resin, phenol resin, polybutadiene resulting from curing by radical initiation and the like and a thermoplastic class of nylon-66, polycarbonate, polyphenylene oxide, polyethylene terephthalate and the like. Further, polyphenylene sulfide, polyimide, wholly aromatic polyester and the like are in common use as a special class.

The foregoing plastic materials, however, are totally unsatisfactory as they are in most cases prone to encounter too low a heat distortion temperature (HDT). This temperature is taken as a measure of heat resistance and desired to be above 250° C. for those plastic materials from a commercial point of view. Although sufficient in terms of exceeding 250° C. in HDT, a certain limiting class of polymers are disadvantageous in that they require elevated temperature on melting, say 350° C. and even higher, and hence result in reduced moldability. One such example is a wholly aromatic polyester of a liquid crystal type.

Butadiene polymers can cure-reacted, as is commonly accepted in the art, usually at a temperature of 100° to 160° C. and typically with the use of an organic initiator such as dicumyl peroxide. This prior mode of curing fails to sufficiently crosslink the polymer at its vinyl groups and thus leads to a small reactivity in the range of 5 to 15%, eventually producing a cured molding with too low an HDT temperature of about 60° to 110° C.

Thus the existing situation of the prior art has lent an impetus for the provision of butadiene polymers which enable pouring into molds at a lower temperature than 200° C. and on curing have a higher HDT temperature than 250° C.

SUMMARY OF THE INVENTION

The present invention seeks to provide a novel thermosetting polymer which is low in viscosity and easy to handle prior to curing and ultrahigh in heat resistance after curing. The invention also seeks to provide a process for producing such polymer by reaction of a specific base polymer with a specific initiator compound.

The thermosetting polymer according to the invention is particularly useful for aircraft bodies, automobile chassis, resinous parts for electronic equipment and the like.

As will become better understood from the following description, one aspect of the invention provides a thermosetting polymer comprising as a base polymer a polybutadiene having a vinyl content of not less than 40% by mol of the total monomer mol and a crosslink reactivity of at least 70% in terms of the vinyl content.

Another aspect of the invention provides a process for producing a thermosetting polymer, which comprises reacting a base polymer with an initiator compound at a temperature of from 240° to 320° C., the base polymer comprising a polybutadiene having a vinyl content of not less than 40% by mol of the total monomer mol, the compound having the following formula

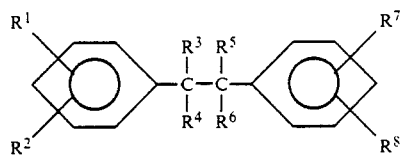

where $R^1$, $R^2$, $R^7$ and $R^8$ are a hydrogen atom, an alkyl group of 1 to 3 carbon atoms, a nitrile group or a halogen atom, and $R^3$, $R^4$, $R^5$ and $R^6$ are an alkyl group of 1 to 3 carbon atoms.

DESCRIPTION OF THE PREFERRED EMBODIMENTS

Figure 1:
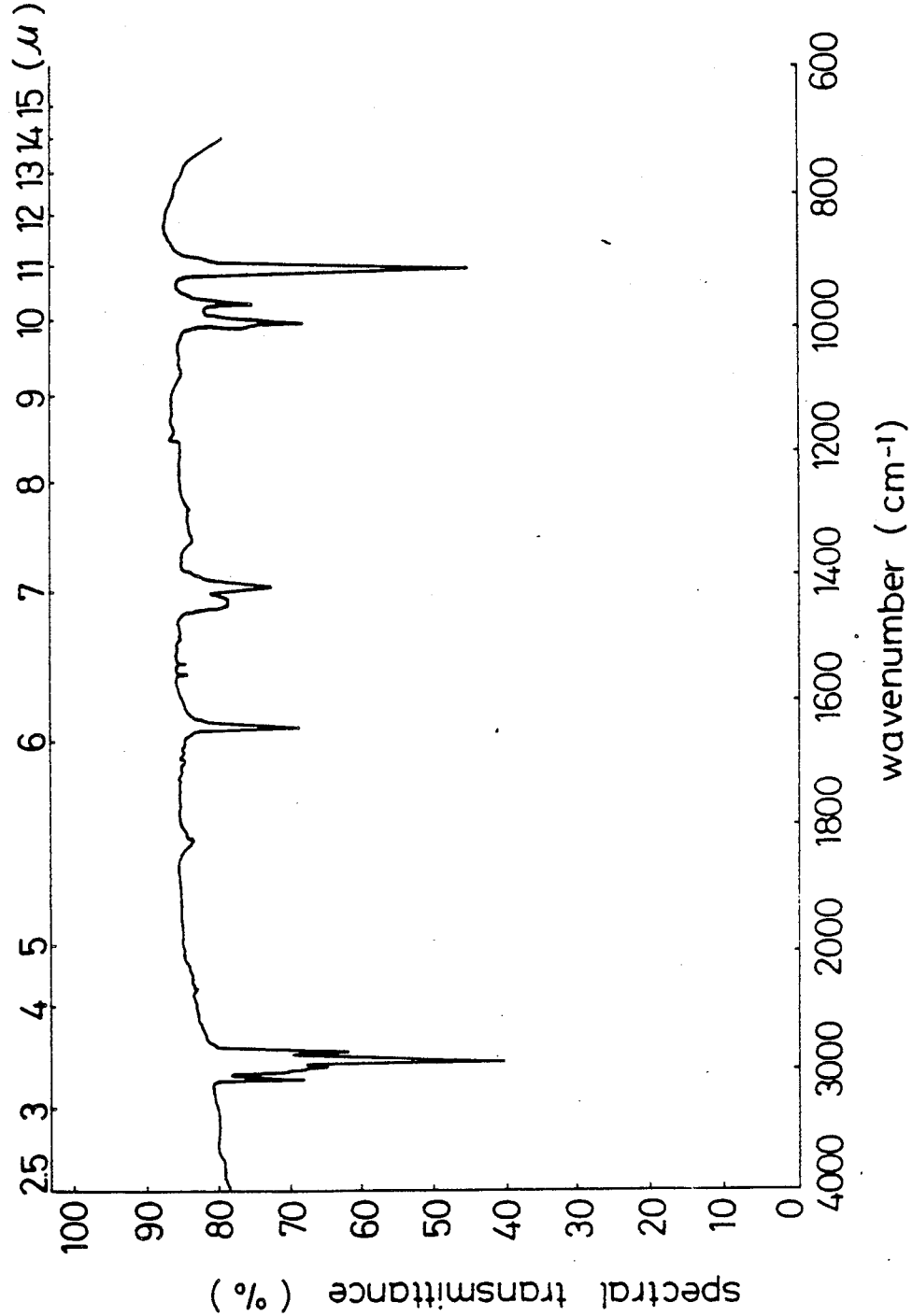
FIGS. 1 and 2 are spectral representations, prior to and after cure reaction, of a thermosetting polymer embodying the present invention.

A first embodiment of the present invention is directed to a thermosetting polymer comprised of a specific polybutadiene as a base polymer and configured to be crosslinked at a specific level.

Base polymers eligible for purposes of the invention are obtainable by various polymerizations of butadiene. Modes of reaction may be chosen for example from anionic polymerization initiated by a sodium dispersant and an organoalkali catalyst, radical polymerization by an organic peroxide, cationic polymerization by a Friedel-Crafts type catalyst and an anionic coordination polymerization by a Ziegler type catalyst. The base polymer has three kinds of double bonds that are vinyl, cis and trans bonds.

The base polymer according to the invention may have a vinyl content of not less than 40% by mol, preferably 50% by mol or greater, more preferably 70% by mol or greater, in terms of the total monomer mol. According to one important feature of the invention, the vinyl content in the final polymer should be held in crosslinked relation in an amount of not less than 70%. Above 80% is still better and above 90% most preferable.

The vinyl content referred to above is determined by quantitative analysis of an absorbance at a wavenumber of 910 cm$^{-1}$ by means of infrared spectrophotometry. Crosslinkage is expressed as $$(\%) C = \frac{A - B}{A} \times 100$$

where
C: crosslink reactivity
A: a vinyl content prior to cure
B: a vinyl content after cure The base polymer may range in molecular weight from 500 to 100,000, preferably from 1,000 to 20,000, more preferably from 1,500 to 8,000. The molecular weight if below 500 would lead to prolonged cure reaction. Above 100,000 would make the resulting polymer objectionably viscous and hence difficult to handle, entailing molding failure.

Where it is found desirable, the base polymer may be reformed in conventional fashion in the presence of a suitable acid or peroxide to thereby bond a hydroxyl or carboxyl group to the terminal end. Typified are a polybutadiene derived from incorporation of maleic anhydride and a polybutadiene in which the carbon-carbon linkage has been epoxidized. Either polymer should of course meet the above requirement of vinyl contents.

Alternatively, the base polymer may be applied as a copolymer in which butadiene is copolymerized for instance with styrene, alpha-methylstyrene, acrylonitrile or the like such that the vinyl content is governed as specified above. Styrene is the best choice of those comonomers.

In accordance with a second embodiment of the invention, a process is provided for the production of a thermosetting polymer by cure reaction of any one base polymer of the first embodiment with a specific compound as an initiator to be mentioned.

Compounds used as the initiator are represented by the formula

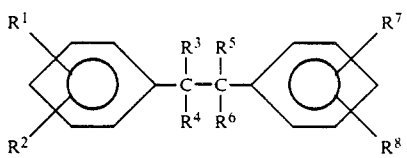

where $R^1$, $R^2$, $R^7$ and $R^8$ are a hydrogen atom, an alkyl group of 1 to 3 carbon atoms, a nitrile group or a halogen atom, the halogen being fluorine, chlorine, bromine or iodide, and $R^3$, $R^4$, $R^5$ and $R^6$ are an alkyl group of 1 to 3 carbon atoms.

Specific examples of the compound include 2,3-dimethyl-2,3-diphenylbutane, 2,3-diethyl-2,3-diphenylbutane, 2,3-dimethyl-2,3-di(p-methylphenyl)butane, 2,3-dimethyl-2,3-di(p-chlorophenyl)butane, 2,3-dimethyl-2,3-di(p-iodophenyl) butane, 2,3-dimethyl-2,3-di(p-nitrophenyl)butane and the like. Particularly preferred are 2,3-dimethyl-2,3-diphenylbutane and 2,3-diethyl-2,3-diphenylbutane, and better chosen is the former compound.

To implement the second embodiment, the initiator should be added in an amount of 0.005 to 10 parts by weight, preferably 0.05 to 4 parts by weight, more particularly 0.2 to 2 parts by weight, based on 100 parts by weight of the base polymer. Below 0.005 part would not be effective for curing, whereas above 10 parts would be feasible only in an expensive manner.

Reaction temperatures may be at from 240° to 320° C., preferably from 250° to 310° C., more preferably from 260° to 300° C. Lower temperatures than 240° C. would be responsible for insufficient curing, and higher than 320° C. should be avoided to preclude thermal decomposition and hence unacceptable coloration. Reaction durations are dependent upon cure temperatures but convenient in the range of 10 minutes to 10 hours, preferably 20 minutes to 3 hours.

Cure reaction may be effected, though not restricted, in a solvent-free atmosphere. A suitable solvent or plasticizer may if necessary be present as a curing aid, and in such instance the aid should not be vaporable at a given cure temperature. Preheating may also be possibly done to partly cure the reaction system, i.e. the base polymer-initiator composition so that the reaction is facilitated.

The composition according to the invention may be blended, where desired, with a different polymer or monomer to suit a particular application. Polymers used herein may be selected from natural rubber, chloroprene rubber, polymethylmethacrylate, polystyrene and the like. Included in suitable monomers are trimethylolpropane triacrylate, trimethylolpropane trimethacrylate, pentaerythritol triacrylate, pentaerythritol trimethacrylate, triallyl isocyanurate, triallyl cyanurate and the like. In either case of polymer and monomer the proportion may preferably be not more than 10 parts by weight per 100 parts by weight of the base polymer.

Various inorganic fillers may be employed which are chosen from those of particulate, fibrous, spherical and similar shapes. Particulate fillers include metal oxides such as iron oxide, alumina, magnesium oxide and the like, metal oxide hydrates such as aluminum hydroxide, magnesium hydroxide and the like, carbonate salts such as calcium carbonate and the like and silicate salts such as talc, clay and the like. Fibrous fillers are fibers such as of carbon, glass, potassium stannate, ceramics, metal carbide and the like. The filler may preferably be added in an amount up to 200 parts by weight based on 100 parts by weight of the base polymer.

The thermosetting polymer of the invention has now been found ultrahighly resistant to heat with a heat distortion temperature of at least 250° C. and even beyond 350° C. These beneficial effects are unexpectedly conspicuous as against those attainable with the prior curing of polybutadienes by radical initiation.

The invention will now be described by way of the following examples which are provided for purposes of illustration.

EXAMPLE 1

To 100 g of a liquid polybutadiene of 3,000 in number average molecular weight, 65% by mol in vinyl content and 500 cp in viscosity at 25° C. (Polybutadiene B-3000, Nippon Petrochemical Co.) was added 1.0 part by weight of 2,3-dimethyl-2,3-diphenylbutane. The mixture was stirred at 80° C. to give a curable material. Uniform coating of the resulting material was effected by a spinner over a NaCl plate on which a similar NaCl plate was then disposed. There was provided a test sample according to the invention in which the curable material was sandwiched between the plates. Analysis was made by an infrared spectrophotometer (IR-420, Shimadzu Seisakusho Co.) with the results shown in FIG. 1.

Figure 2:
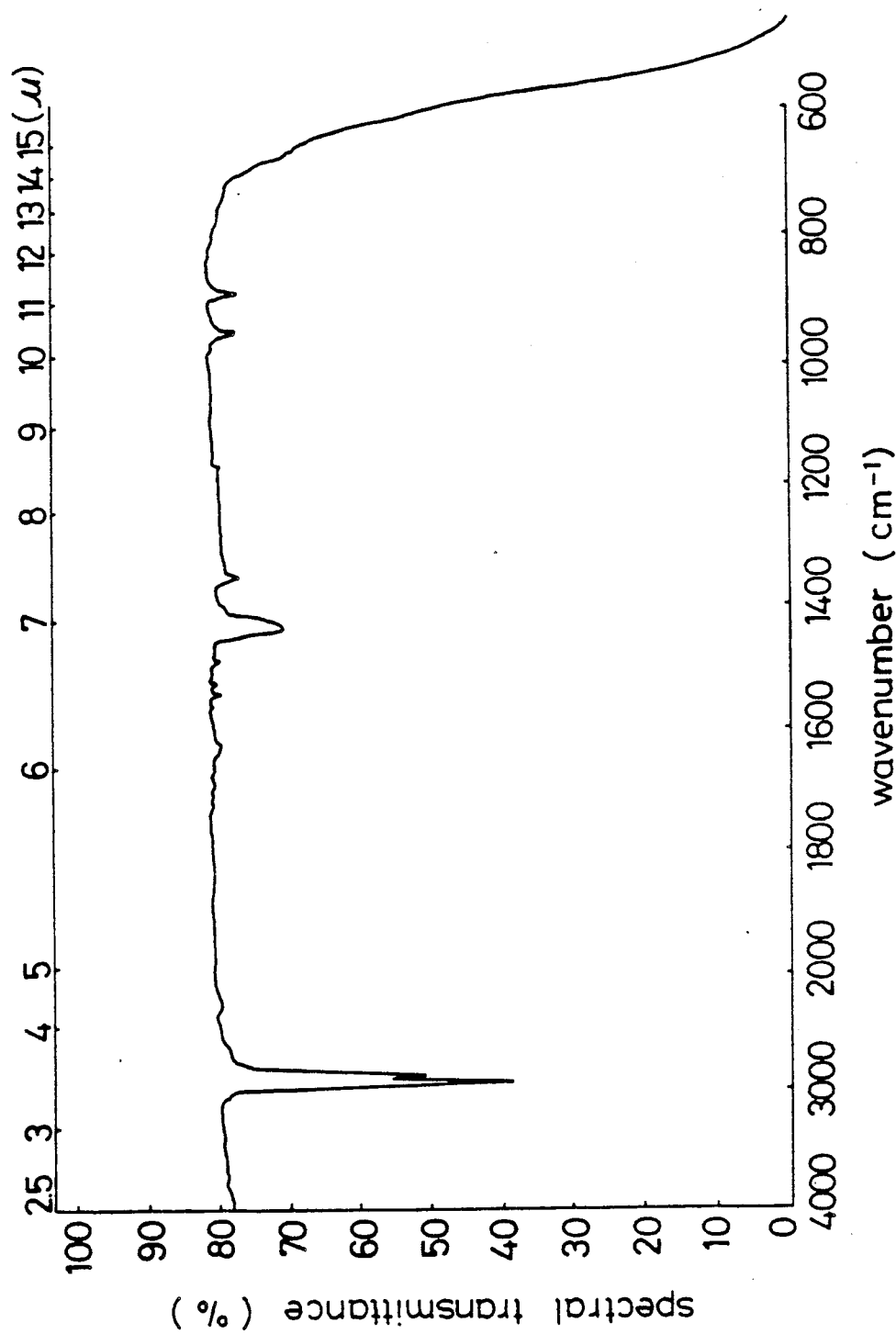

The sample was thereafter cured for 2 hours in a chamber purged with nitrogen and maintained at 290° C., followed by spectrophotometric examination by means of the above tester. The results are seen from FIG. 2 in which the vinyl group is represented at an absorbance of 910 cm$^{-1}$. Crosslink reactivity has been proved to be 90.4% as counted from Lambert-Beer's law by taking an absorbance of 2,900 cm$^{-1}$ as a standard.

Figure 3:
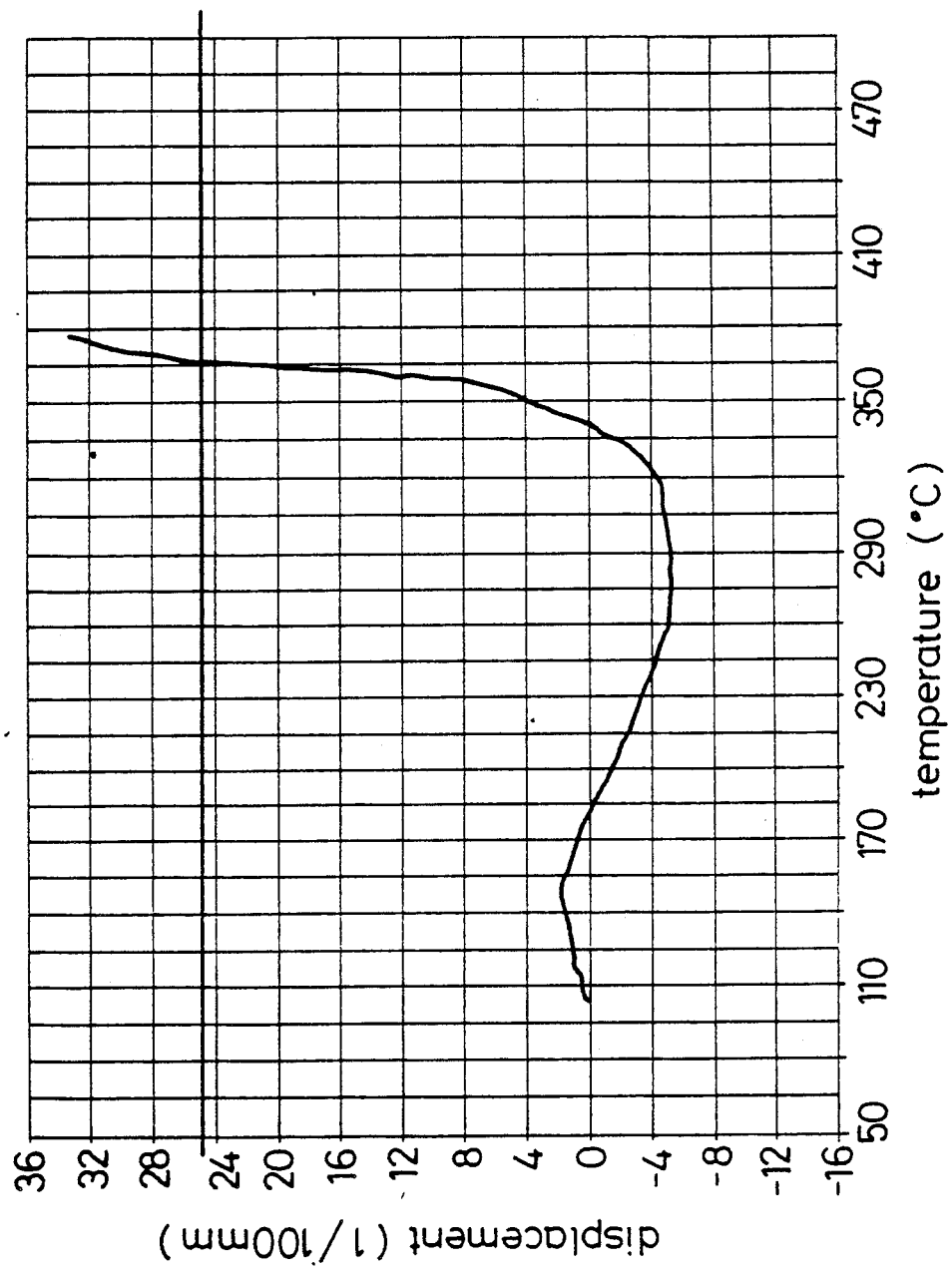
FIG. 3 is a graphic representation, as a curve of heat displacement against cure temperature, of the polymer of FIG. 2.

Subsequently, the cured sample was poured into a brass mold which was then immersed for further curing in an oil bath at 290° C. for 2 hours. The molding thus obtained was examined for heat distortion temperature on a heat distortion tester (HD-500-PC, Yasuda Seiki Seisakusho Co.). The results are shown in FIG. 3 from which the molding has been found to be extremely high at 371° C. in that temperature. Bending modulus and C. curing was not possible and crosslink reactivity not determinable.

As appears clear from the tabulated results, the cured products representing the invention show a crosslink reactivity exceeding 90%. This is interpreted to mean that crosslinkage is greatly enhanced as compared to the prior art curing by radical initiation. Also notably, the inventive products are by far higher than 300° C. in heat distortion temperature and sharply contrastive to the controls.

Obviously, various modifications and alterations may be made to the above specified embodiments without departure from the scope of the appended claims.

TABLE

| | polymer (wt part) | | | initiator (wt part) | | cure temp. (°C.) | crosslink reactivity (%) | properties* | | |
| | | | | 2,3-dimethyl-2,3-diphenyl-butane | dicumyl peroxide | | | HDT (°C.) | BM (kgf/mm$^2$) | BS (kgf/mm$^2$) |
| run | poly-butadiene | poly-butadiene | poly-isoprene | | | | | | | |
| --- | --- | --- | --- | --- | --- | --- | --- | --- | --- | --- |
| Example | | | | | | | | | | |
| 1 | 100 | — | — | 1.0 | — | 290 | 90.4 | 371 | 231 | 5.1 |
| 2 | — | 100 | — | 1.0 | — | 290 | 90.1 | 358 | 223 | 5.0 |
| Comparative Example | | | | | | | | | | |
| 1 | 100 | — | — | — | 1.0 | 160 | 11.9 | 92 | 87 | 1.6 |
| 2 | 100 | — | — | 1.0 | — | 200 | 5.3 | — | | |
| 3 | — | — | 100 | 1.0 | — | 290 | — | — | | |

*HDT: heat distortion temperature
BM: bending modulus
BS: bending strength bending strength were also determined with the results tabulated.

EXAMPLE 2

The procedure of Example 1 was followed except for the use of a liquid polybutadiene of 2,000 in number average molecular weight, 65% by mol in vinyl content and 150 cp in viscosity at 25° C. (Polybutadiene B-2000, Nippon Petrochemical Co.). The results are as per tabulated.

COMPARATIVE EXAMPLE 1

The procedure of Example 1 was followed except that 1.0 part by weight of dicumyl peroxide was used in place of 2,3-dimethyl-2,3-diphenylbutane and that stirring was done at 50° C., after which a curable material was provided.

Figure 4:
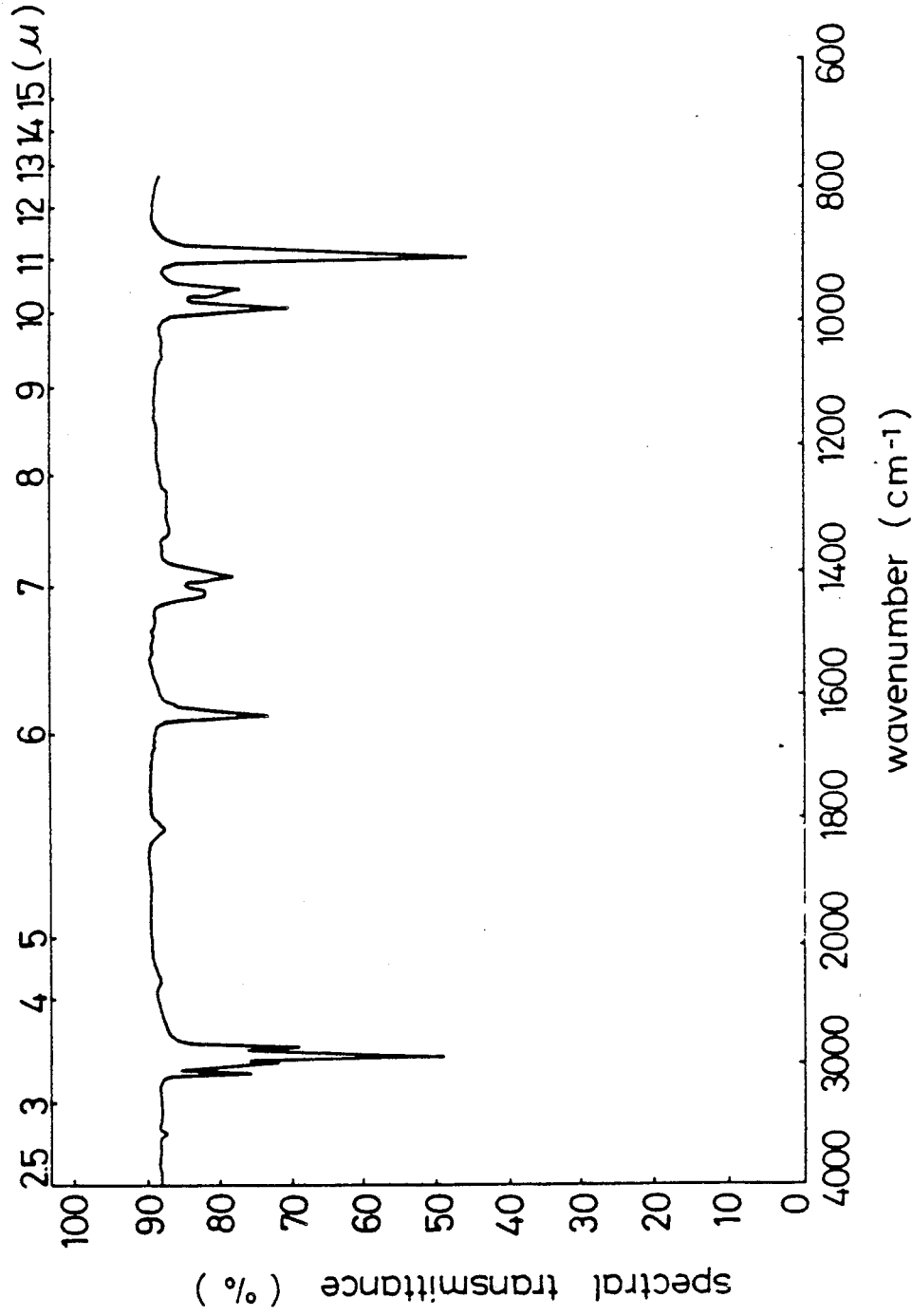
FIGS. 4 and 5 are views similar to FIGS. 1 and 2 but explanatory of a control polymer.
Figure 5:
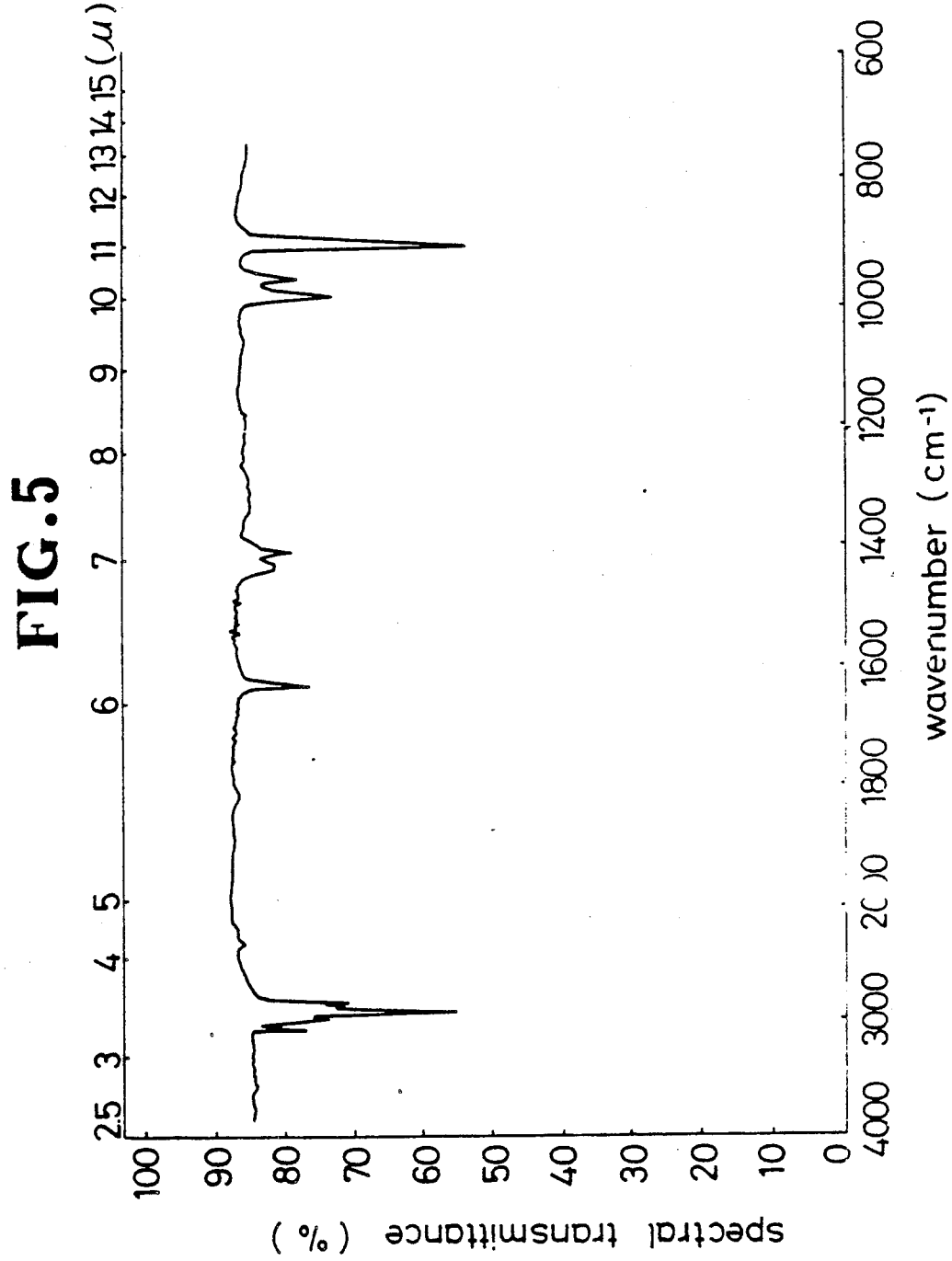

The resultant material was used to form a test sample of two NaCl plates laminated as in Example 1, and curing was performed for 2 hours in a chamber regulated at 160° C. FIG. 4 is directed to a spectrophotometric analysis of the curable material and FIG. 5 to that of the cured sample. Crosslink reactivity has been determined to be as low as 11.9%.

The cured sample after being put into a mold was subjected to further curing in an oil bath at 160° C. for 2 hours. Bending properties of the resulting molded article were examined with the results tabulated.

COMPARATIVE EXAMPLE 2

The procedure of Example 1 was followed except that the curing temperature was varied at 200° C. Curing was impossible.

COMPARATIVE EXAMPLE 3

The procedure of Example 1 was followed except for the use of a liquid polyisoprene of 25,000 in molecular weight (Kuraprene LIR-30, Kuraray Co.). Even at 290°

What is claimed is:

1. A thermoset polymer comprising as a base polymer a butadiene homopolymer or a copolymer of butadiene with a comonomer, each of said homopolymer and copolymer having a vinyl content of not less than 40% by mol of the total monomer mol and cured in a crosslink reactivity of at least 70% in terms of said vinyl content.

2. The polymer of claim 1 wherein said base polymer has a molecular weight of from 500 to 100,000.

3. The polymer of claim 1 wherein said base polymer has a hydroxyl or carboxyl group bonded to the terminal end.

4. The polymer of claim 1 wherein said comonomer is styrene, alpha-methylstryrene or acrylonitrile.

5. A thermoset polymer comprising as a base polymer a homopolymer or a copolymer of butadiene with a comonomer, each of said homopolymer and copolymer having a vinyl content of not less than 40% by mol of the total monomer mol, which thermoset polymer results from reacting said base polymer with an initiator compound at a temperature of from 240° to 320° C., said initiator compound having the following formula

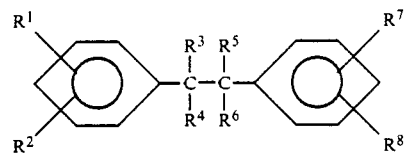

where $R^1$, $R^2$, $R^7$ and $R^8$ are a hydrogen atom, an alkyl group of 1 to 3 carbon atoms, a nitrile group or a halogen atom, and $R^3$, $R^4$, $R^5$ and $R^6$ are an alkyl group of 1 to 3 carbon atoms, and said base polymer being cured in a crosslink reactivity of at least 70% in terms of said vinyl content.

* * * * *